United States Patent
Shima

(10) Patent No.: US 10,271,179 B1
(45) Date of Patent: Apr. 23, 2019

(54) GEOLOCATION DETERMINATION USING DEEP MACHINE LEARNING

(71) Applicant: Ball Aerospace & Technologies Corp., Boulder, CO (US)

(72) Inventor: James Michael Shima, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 15/973,022

(22) Filed: May 7, 2018

Related U.S. Application Data

(60) Provisional application No. 62/501,918, filed on May 5, 2017.

(51) Int. Cl.
   *G06N 20/00* (2019.01)
   *H04W 4/029* (2018.01)

(52) U.S. Cl.
   CPC ............ *H04W 4/029* (2018.02); *G06N 20/00* (2019.01)

(58) Field of Classification Search
   CPC ... G01C 21/206; G01S 5/0252; G01S 5/0273; G01S 3/02; H04W 64/00; H04W 4/00; H04W 84/18; G01N 99/00
   See application file for complete search history.

(56) References Cited

U.S. PATENT DOCUMENTS

| | | | |
|---|---|---|---|
| 6,437,692 B1 * | 8/2002 | Petite | G01D 4/004 340/540 |
| 7,020,501 B1 * | 3/2006 | Elliott | H04W 52/0216 455/574 |
| 7,590,098 B2 * | 9/2009 | Ganesh | H04W 4/00 370/310 |
| 2006/0030332 A1 * | 2/2006 | Carrott | G01S 5/06 455/456.1 |
| 2007/0010956 A1 * | 1/2007 | Nerguizian | G01C 21/206 702/57 |
| 2008/0045235 A1 | 2/2008 | Kennedy et al. | |
| 2015/0009072 A1 | 1/2015 | Nijsure | |
| 2017/0120906 A1 * | 5/2017 | Penilla | G05D 1/0011 |
| 2018/0019910 A1 * | 1/2018 | Tsagkaris | G06N 99/005 |
| 2018/0025641 A1 * | 1/2018 | LaVelle | G08G 1/143 340/932.2 |
| 2018/0107215 A1 * | 4/2018 | Djuric | G01C 21/26 |

* cited by examiner

*Primary Examiner* — Nizar N Sivji
(74) *Attorney, Agent, or Firm* — Sheridan Ross P.C.

(57) ABSTRACT

Methods and systems for locating a target radio frequency (RF) device within an area are provided. In particular, a signal sent from a known transmitter while that transmitter is at a known location is received by a plurality of receivers located in or around the area. This is repeated multiple times for multiple locations. Representations of the signals received at the receivers for the different locations are provided as inputs to a neural network and are used to train the network. After training, representations of signals received at the receivers as a result of one or more signals emitted from a target transmitter located in or traveling through the area can be provided to the network, which in response provides a location of the target transmitter.

20 Claims, 7 Drawing Sheets

GEOLOCATION DETERMINATION USING DEEP MACHINE LEARNING

CROSS-REFERENCE TO RELATED APPLICATIONS

This application claims the benefit of U.S. Provisional Patent Application Ser. No. 62/501,918, filed May 5, 2017, the entire disclosure of which is hereby incorporated herein by reference.

FIELD

Systems and methods for determining the geolocation of a radio frequency transmitter using deep machine learning are provided.

BACKGROUND

Tracking the location of a transmitting wireless device, such as a cellular telephone, often involves the use of direction finding equipment. Conventional direction finding equipment can utilize a directional antenna to determine a direction to a transmitter. A direction finder typically includes several antennas that are used to find the location of a remote transmitter by analyzing the different arrival times of the RF signal from the transmitter that is received at the separate antennas. Because such systems do not generally provide range information, triangulation of the transmitter using multiple direction finding devices is required to fix a location of the transmitter. This can be difficult or impossible when the transmitter is being carried by a person who is walking, travelling in a car, or otherwise is moving. Moreover, when the transmitter is moving through an urban or other environment with structures or other features, multipath and scattering effects can make locating the transmitter that much more difficult. This is because the antennas may receive delayed versions of the RF signal, causing ambiguity and an incorrect location determination. Accordingly, in such environments, tracking a moving transmitter often requires the use of a tracking system that is itself mobile, so that a more or less direct line of sight to the transmitter can be maintained by following the transmitter with a direction finding device.

As an alternative to terrestrial tracking devices, it is possible to locate a transmitter using satellite or airborne detectors. In such systems, frequency difference of arrival (FDOA) and time difference of arrival (TDOA) techniques can be used. These systems are commonly used in proprietary systems, intelligence applications, and for monitoring of RF ground resources. However, such techniques are only effective when the transmitter has a clear line of sight to the transmitter and when the signals do not encounter multipath, fading, or any other RF selective path impairment. Alternatively, the channel characteristics of the environment, such as the multipath model, channel fading, and the like, must be well known. However, even when a particular environment is well characterized, the added Doppler and multipath effects when the transmitter is moving makes accurately locating the transmitter especially difficult. Accordingly, systems employing such techniques do not themselves provide a solution to the problem of tracking a moving transmitter in a clustered, urban or other environment in which direct lines of sight to the transmitter are not available, and in which multipath or scattering effects are present.

SUMMARY

In accordance with embodiments of the present disclosure, systems and methods are provided that utilize a learning algorithm, also referred to herein as deep learning or deep neural network, to enable the location of a transmitting wireless device to be determined. The disclosed technology includes placing a plurality of receiving antennas around a monitored area or environment. A transmitting antenna or known transmitter is moved through the environment, and information regarding the signal received at each receiving antenna or receiver while the known transmitter is at different known locations is recorded. The process of moving the known transmitter to different known locations and recording characteristics of that signal as received at the different receivers can be repeated multiple times. This recorded data is a signature of the multipath effects, scattering, and any other effects imparted to the transmitted signal while the known transmitter is at the different locations in the environment. Deep learning techniques are then used to train a detection system so that it can locate a transmitter within the area based on the received signals, even where the location of the transmitter does not exactly correspond to one of the locations from which the known transmitter emitted a signal.

More particularly, a spectrogram received at each receiver while the known transmitter is at a known location is recorded, and the system is taught that the information within those spectrograms corresponds to the known location. This is repeated for a number of known locations. The result is a model of the expected spectrograms at each receiver for a transmitter at the different locations within the environment. From this model, the system is taught to generalize or to interpolate, such that a spectrogram created by a transmitter within in the modeled environment having an otherwise unknown location can be used to determine the location of the transmitter. In accordance with still other embodiments, the receivers can comprise multiple element antennas, with a spectrogram from each element being usable as information that can further model the environment.

Additional features and advantages of embodiments of the disclosed systems and methods will become more readily apparent from the following description, particularly when taken together with the accompanying drawings.

DETAILED DESCRIPTION

Figure 1:
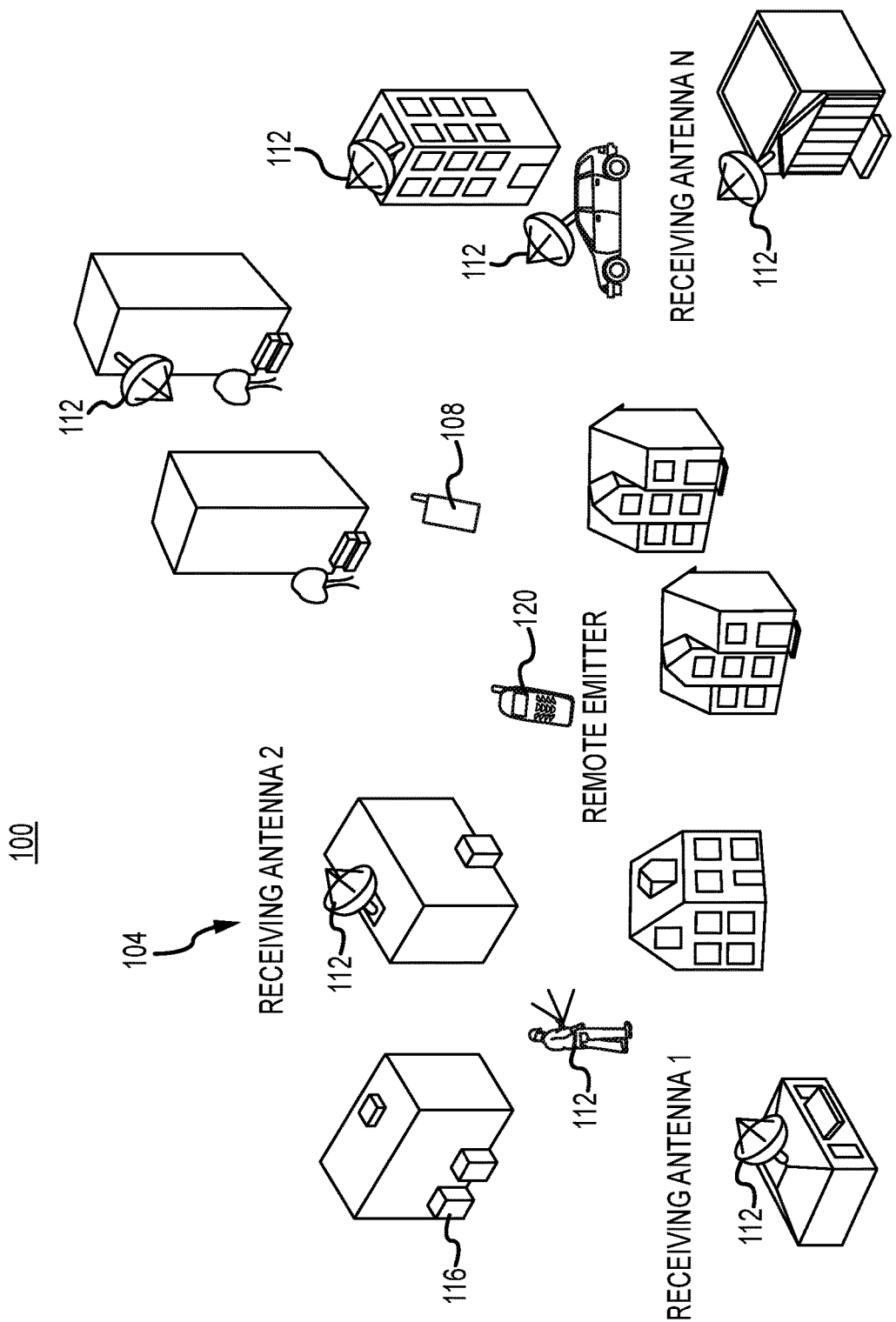
FIG. 1 is a depiction of a monitored area and components of a system for geolocating a radio frequency transmitter within that area in accordance with embodiments of the present disclosure.

The present disclosure provides systems and methods for geolocating transmitting radio frequency (RF) systems or emitters, hereinafter referred to as target transmitters, using deep learning. The systems and methods described herein utilize a novel approach to geolocating transmitters in a given area through supervised learning of collected RF signals from a multitude of receivers, each of which include one or more receiving antennas, within or surrounding an area, and enable accurate geolocation in environments in which multipath effects are present, such as but not limited to a built environment, an urban area, a mountainous environment, or any other area in which manmade or natural features create multipath effects, hereinafter referred to as a clustered environment. In accordance with embodiments of the present disclosure, the receivers capture data from a known transmitter operated at multiple known locations in the desired area, and that data is processed using deep learning. An unsupervised system then leverages the learned deep network to nonlinearly solve for the location corresponding to a given radio frequency (RF) signature.

More particularly, embodiments of the present disclosure address the issues raised by attempting to determine a location of a transmitter in a multipath-rich environment utilizing multiple receivers and deep learning techniques, which leverage non-linear processing and neural networks to solve highly-complex and large dimensionality problems. In one example implementation, the disclosed system first requires a calibration procedure to characterize the signal received from a known transmitter at a plurality of known locations in an area. Specifically, each location is recorded, for example in terms of latitude and longitude or other coordinates, and the corresponding RF signals received at each receiving antenna in the area are measured and recorded for each of the recorded locations. In accordance with at least some embodiments of the present disclosure, the antennas may be mounted uniformly around the area of interest. This may give the best dilution of precision (DOP), but in a clustered environment a signal will effectively be blocked from some antennas, resulting in fading and other detrimental effects.

The calibration routine can include making a grid of the area with known latitude and longitude coordinates. The grid density may be tailored to the area, and it can be orders of magnitude greater than the RF wavelength. The procedure includes using the known transmitter to transmit a signal at a known frequency and known location, for example as determined using a reference GPS receiver. The signal as it is received at each receiver while the known transmitter is transmitting from a known location is stored, creating a snapshot of RF signals originating from the known transmitter. The known transmitter may then be taken to a next know location, and the capture of data at each receiver is repeated. For each transmitting location, since the known transmitter device is not moving, the receiving antennas receive an impaired or modified RF signal that embodies a snapshot of a signal transmitted from that location in the environment. These signals, with the RF environmental effect imposed on each, present a unique signature that can later be used to determine the location of a target transmitting device, where the location of the target transmitter is not known a priori. More particularly, the phasing, amplitude, and other characteristics of each RF signal, viewed as a coupled data set using all the antennas of the receivers, allows location determination due to the fact that the multipath and other effects on a signal are different for each different transmission location within the modeled area or environment.

FIG. 1 illustrates an example area or environment 100 in which an RF transmitter locating system 104 in accordance with embodiments of the present disclosure is deployed. In this example, the area 100 encompasses a clustered environment in the form of an urban environment. However, embodiments of the present disclosure can be usefully deployed in any area in which the ability to locate an RF transmitter (hereinafter referred to as a target transmitter 120), including a moving target transmitter 120, is desirable. Moreover, embodiments of the present disclosure provide an RF transmitter locating system 104 that can operate effectively even in embodiments in which clear lines of sight between the target transmitter 120 and one or more receivers 112 are not available, and/or in which high levels of multipath interference are present.

In general, the RF transmitter locating system 104 can include a known RF transmitter 108, hereinafter referred to as a known transmitter 108, a plurality of receivers 112*a*-*n*, and a system controller 116. A known transmitter 108 and a target device 120 can be mobile devices that are generally capable of transmitting an RF signal. As described herein, in a calibration mode or procedure, the known transmitter 108 is operated to transmit an RF signal from multiple known locations within the area 100. The RF signal transmitted by the known transmitter 108 may have characteristics that are the same as or similar to a prospective target transmitter 120. For example, where a target transmitter 120 is a cellular telephone, the known transmitter 108 may itself comprise a mobile telephone or other transmitter that is capable of transmitting an RF signal at the same frequency bands and with the same modulation or transmission techniques as the target transmitter 120. Accordingly, examples of a known transmitter 108 and/or a target transmitter 120 can include a mobile telephone, a radio, a software defined radio, a personal data assistant (PDA), a tablet, smart watch, gaming remote, or other type of computing device having a wireless communication or transmission capability. In addition, the known transmitter 108 can include or be associated with a location determining device, such as but not limited to a global positioning system (GPS) receiver. While the known transmitter 108 is operated at various locations, the signal as detected at the receiving antennas or receivers 112 is recorded and provided to the system controller 116, together with an identification of the location within the area 100 from which a particular transmission was made.

The buildings, large structures, and topographical or other large scale features within a geographic area 100 produce bulk multipath, fading, signal polarization, and other effects that modify signals transmitted from locations within the area. The modification of a signal due to such effects is particular to the location at which a signal is transmitted, and the location of a receiver 112. Therefore, the effect of the features of an area 100 on a signal emitted from the transmitter 108 or 120 within the area 100 and received at a receiver 112 will generally be different for transmissions from different locations. Moreover, where the locations of the receivers 112 are fixed, the unique pattern of modifications for different locations create a signature that, as described herein, can be used to determine a location of a target transmitter 120. As can be appreciated by one of skill in the art after consideration of the present disclosure, the version of the signature of a transmission from a particular location received at the different receivers 112 will typically be unique for each receiver. These differences can be aggregated to form a map of transmission effects within the area 100. By considering the different signatures or characteristics of a signal as that signal is received at different receivers 112, the signatures of received signals can be compared to the recorded data to be used to discriminate different transmission locations within the area 100. This is akin to multi-antenna MIMO techniques used in 4G cellular networks, where multipath is needed in order to send more data over the wireless link (by taking advantage of the extra RF paths afforded by multipath). As such, these techniques may be less effective in a strictly line of sight (LOS) situation. Accordingly, embodiments of the present disclosure take advantage of the multipath and other effects of the physical environment 100, along with the use of multiple receivers 112 at different locations, in order to uniquely determine the location of a target transmitter 120. In accordance with at least some embodiments of the present disclosure, in the calibration mode the RF signal captures may be associated with a timing reference for proper time alignment. This can be achieved using a GPS receiver with clock disciplining on every receiver 112.

Once the calibration procedure is complete, the collected RF signals can be time aligned from each receiver 112 and combined with the latitude and longitude grid points, hereinafter referred to simply as grid points. As can be appreciated by one of skill in the art, the coordinates of the grid points can be expressed as a latitude and longitude, or according to any other absolute or referential coordinate system. In addition, the use of the term "grid points" is not to imply that the measurements of the signal transmitted by the known transmitter 108 be taken at regular intervals within the coordinate system. A supervised deep neural network (DNN), implemented by the system controller 116 (or a connected system) is then trained on the RF signal data with the latitude and longitude acting as the desired output for each set of RF signals captured at that grid point. The system controller 116 then uses the data to train the system to recognize the characteristics of a received signal that is transmitted from each of the locations, and further to enable the system 104 to determine the location of a signal transmitted by a target transmitter 120 from a location that does not coincide with one of the known locations. Accordingly, when the RF transmitter locating system 104 is operational, it can include a target transmitter 120, the location of which can be determined using the other components of the system 104 as described herein.

As part of training, the DNN is provided with the phase, amplitude, and channel characteristics (delay spread, frequency-dependent fading, polarization phase changes, etc.) of the RF signals for each location at which the known transmitter 108 is operated. Since the multipath will significantly degrade some of the received signals, the DNN can determine which signal characteristics received at each receiver 112 correspond to a given location within the area 100. In other words, the channel multipath and fading is used as a unique feature set that can be solved (in a highly nonlinear space) into an actual location.

After training the DNN, the system 104 has the ability to generalize on RF inputs it has not seen before. This generalization can solve for inputs the network has not seen, which may be all locations between locations used in the calibration. In this case, if a target device 120 is transmitting out in the "wild" in the desired area, the DNN can constantly monitor the RF signals from all the receivers and directly compute a latitude and longitude of the target device based only on the received RF signals.

This approach is not feasible with classical techniques, as one must solve navigation or geometric equations from TDOA measurements to get accurate positioning. Here we are letting the non-linear processing of the DNN directly compute latitude and longitude based only on the RF signatures collected at the antenna locations. Note that if the grid layout is sparse, the network may be able to unambiguously interpolate between grid points by processing RF signals it has not seen previously, resulting in a latitude and longitude measurement that is accurate using a small number of grid points. This may depend on the system design and the clutter within the clustered environment. More receiver 112 antennas provide a more complete view of the RF environment. And more grid points give larger training data sets for the network to learn the subtle features in the input data. Since a DNN is known to be a universal function approximator, and is also an Nth dimensional nonlinear interpolator, it is within the scope of the DNN to solve this type of problem. The more data collected, the better the network is able to learn associations and provide generalizations of the input space.

Furthermore, since the DNN is receiving RF data and outputting location information, such as in the form of a latitude and longitude, embodiments of the present disclosure can use received channel characteristics to provide a location in the form of a proper Earth frame of latitude and longitude commensurate with the Earth model used during calibration, i.e. like WGS-84. Accordingly, the conversion of raw RF data into WGS-84 latitude and longitude, or other reference frame, results in a geopositioning solution. This is automatically learned and computed via the stored weights in the network, so no coordinate transformations or other geometric rotations are needed as in classical techniques.

FIGS. 2-5 illustrate functional elements of various components of an example system 104 that may be useful in implementing the described technology for providing geolocation determination. More particularly, as discussed in connection with FIG. 1, the example hardware and operating environment of a system 104 for implementing the described technology includes a system controller or computing device 116, a known transmitter 108, a plurality of receivers 112, and a target device 120.

Figure 2:
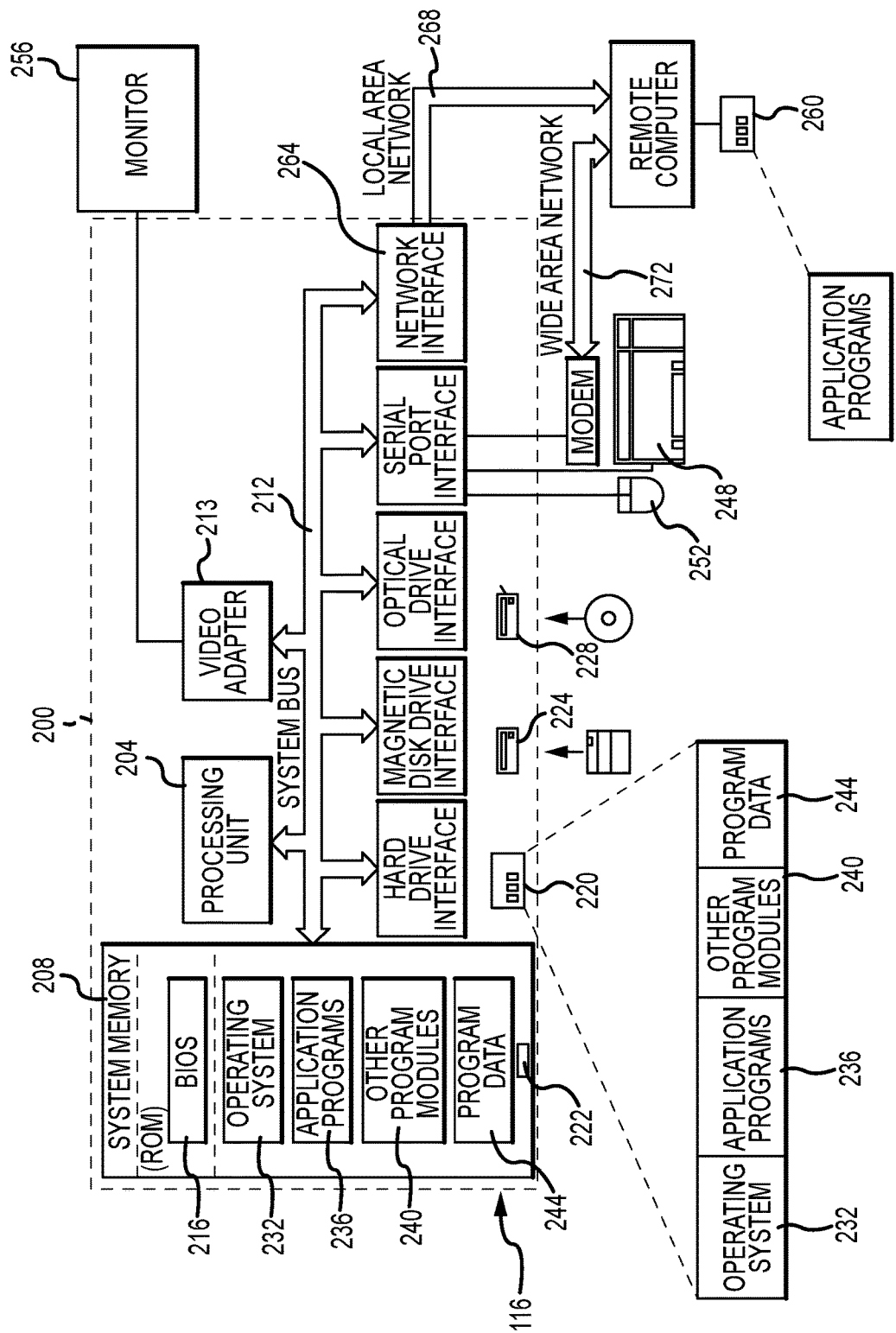
FIG. 2 is a block diagram depicting functional elements of a system controller in accordance with embodiments of the present disclosure.

In accordance with embodiments of the present disclosure, and as depicted in FIG. 2, for example, the system controller 116 may include a general-purpose computing device in the form of a computer 200. The computer 200 includes a processing unit 204, a system memory 208, and a system bus 212 that operatively couples various system components including the system memory to the processing unit 204. The processing unit 204 may comprise a general purpose programmable processor, controller, or other device capable of executing application software or firmware, and/or operating system code. There may be only one or there may be more than one processing unit 204, such that the processor of the computer 200 comprises a single central-processing unit (CPU), or a plurality of processing units, commonly referred to as a parallel processing environment. The computer 200 may be a conventional computer, a distributed computer, or any other type of computer.

The system bus 212 may be any of several types of bus structures including a memory bus or memory controller, a peripheral bus, a switched fabric, point-to-point connections, and a local bus using any of a variety of bus architectures. The system memory 208 may also be referred to as simply the memory 208, and can include read only memory (ROM) and random access memory (RAM). A basic input/output system (BIOS), containing the basic routines that help to transfer information between elements within the computer 200, such as during start-up, is stored in ROM. The computer 200 further includes a hard disk drive or other data storage 220, a magnetic disk drive 224, an optical disk drive 228, or other removable media devices. The drives and their associated tangible computer-readable media provide non-volatile storage of computer-readable instructions, data structures, program modules and other data for the computer 200. It should be appreciated by those skilled in the art that any type of tangible computer-readable media may be used in the example operating environment.

A number of program modules may be stored in the memory and/or on the data storage 220 or drives 224, 228, including an operating system 232, one or more application programs 236, such as a learning algorithm comprising a geolocation module or algorithm 22, other program modules 240, and program data 244. Input devices such as a keyboard 248 and pointing device 252 can also be included. These and other input devices are often connected to the processing unit 208 through a serial port interface that is coupled to the system bus 212, but may be connected by other interfaces, such as a parallel port, game port, or a universal serial bus (USB). A monitor 256 or other type of display device is also connected to the system bus 212 via an interface, such as a video adapter 213. In addition to the monitor 256, the computer 200 include other peripheral output devices (not shown), such as speakers and printers.

The computer 200 may operate in a networked environment using logical connections to one or more remote computers 260 through a network or communication interface 264. The remote computer 260 may be another computer, a server, a router, a network PC, a client, a peer device or other common network node, and typically includes many or all of the elements described above relative to the computer 200. The logical connections depicted in FIG. 2 include a local-area network (LAN) 268 and a wide-area network (WAN) 272. Such networking environments are commonplace in office networks, enterprise-wide computer networks, intranets and the Internet, which are all types of networks. In addition, the computer 200 included in the system control 116 is generally capable of communication with the known transmitter 108 and the receiving antennas 112 through the network interface 264, or through some other communication interface or device included as part of the computer 200 or connected to the computer 200 through the network interface 264 or another communication interface. These logical connections are thus achieved by a communication device coupled to or a part of the computer 200. Examples of connection technologies that may be employed to connect the computer implementing the control system 116 to other devices, such as the known transmitter 108 and the receivers 112, include cellular telephony or data networks, satellite telephony or data networks, wireless or wireline wide area networks, wireless or wireline local area networks, or the like. Moreover, the implementations are not limited to a particular type of communication device or communication technology.

When used in a LAN-networking environment, the computer 200 is connected to the local network 268 through a network interface or adapter 264, which is one type of communications device. When used in a WAN-networking environment, the computer 20 typically includes a modem, a network adapter, a communications interface, or any other type of communications device for establishing communications over the wide area network 272. In a networked environment, program engines depicted relative to the personal computer 200, or portions thereof, may be stored in the remote memory storage device. It is appreciated that the network connections shown are examples and other means of communications devices for establishing a communications link between the computers may be used.

In an example implementation, software or firmware instructions for providing geolocation determination 222 may be stored in memory 208 and/or data storage 220 and processed by the processing unit 204. Rules, algorithms, and/or instructions for providing geolocation determination may be stored in memory 208 and/or data storage 220 as persistent datastores. For example, a geolocation module 222 may be implemented with instructions stored in the memory 208 and/or data storage 220 and processed by the processing unit 204. In accordance with embodiments of the present disclosure, the geolocation module 222 may comprise or incorporate a deep neural network, such as but not limited to a convolutional neural network, that is trained and then deployed as described herein. An application program 236 comprising a GPS parameter processing module may also be implemented with instructions stored in the memory 208 and/or data storage 220 and processed by the processing unit 204.

As described in greater detail elsewhere herein, the control system 116 implemented by the computer 200 or otherwise configured generally operates to collect data comprising copies or representations of signals received from receivers 112 as a result of RF signals emitted from a known transmitter 108 at known locations. That signal data, together with the location information can be stored on the control system 116 or an associated system, and is used by the geolocation module as training data to enable the determination of a location of a target transmitter 120 emitting an RF signal based on copies or representations received from receivers 112 as a result of the RF signal emitted from the target transmitter 120.

Figure 3:
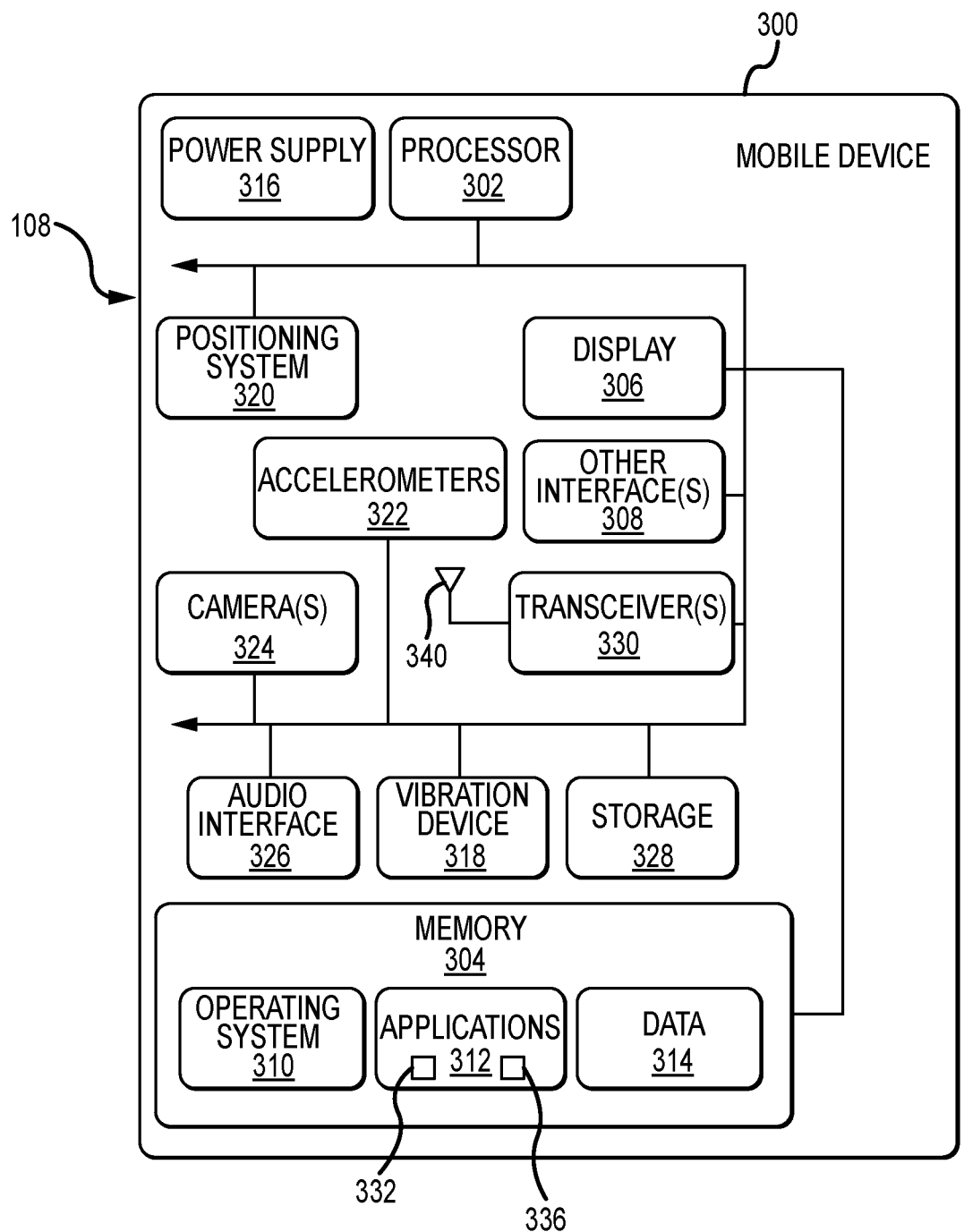
FIG. 3 is a block diagram depicting functional elements of a known transmitter in accordance with embodiments of the present disclosure.

FIG. 3 illustrates a known transmitter 108 in accordance with an embodiment of the present invention. In this example, the known transmitter 108 is implemented as a mobile telephone or device 300. However, as can be appreciated by one of skill in the art after consideration of the present disclosure, the known transmitter 108 can be implemented by other devices having the capability of transmitting RF signals from known locations. The mobile device 300 includes a processor 302, a memory 304, an RF transceiver 330, an antenna 340, and a positioning system 320, such as a global positioning system (GPS) receiver. The mobile device can also include human interface components, such as a display 306 (e.g., a touchscreen display), an audio interface 326, a vibration device 318, and other interfaces 308 (e.g., a keyboard).

The memory 304 generally includes both volatile memory (e.g., RAM) and non-volatile memory (e.g., flash memory). An operating system 310, such as the Microsoft Windows® Phone operating system, resides in the memory 304 and is executed by the processor 302, although it should be understood that other operating systems may be employed. One or more application programs 312 are also loaded in the memory 304 and executed in connection with the operating system 310 by the processor 302. An example of an application 312 includes a signal generation application 332, which can operate to generate particular RF signals having particular durations and/or waveforms at particular times and/or locations at particular frequencies that are transmitted by the mobile device 300 antenna 340 via the transceiver 330. Another, example of an application 312 includes a location determining application 336 that can provide location information, for example collected through operation of the GSP receiver or other positioning system 320, to the signal generation application 332 at the time a particular signal is caused to be transmitted by the mobile device 300, for delivery to the controller 116. Other examples of applications 312 include, without limitation, applications enabling voice telephony, email programs, scheduling programs, personal information managers, Internet browsing programs, multimedia player applications, etc. The memory 304 can also provide a store for data 314. Such data can include a waveform pattern data referenced by the signal general application 332 and applied in the generation of transmitted signals, information regarding the time and location at which signals are transmitted, or any other data generated by or transferred to the mobile device 300.

The mobile device 300 includes a power supply 316, which is powered by one or more batteries or other power sources and which provides power to other components of the mobile device 300. The power supply 316 may also be connected to an external power source that overrides or recharges the built-in batteries or other power sources. The mobile device 300 includes one or more communication transceivers 330 to provide network connectivity (e.g., mobile phone network, Wi-Fi®, Bluetooth®, etc.). The mobile device 300 can also include various other components, such as one or more accelerometers 322, one or more cameras 324, an audio interface 326 (e.g., a microphone, an audio amplifier and speaker and/or audio jack), and additional storage 328. Other configurations may also be employed.

As described in greater detail elsewhere, the known transmitter 108 implemented by the mobile device 300 or otherwise configured generally operates to generate RF signals from known locations within an area. Accordingly, information regarding the time and location from which a signal or set of signals is sent is recorded by the known transmitter, and/or is delivered to the control system 116 for use in training the geolocation module to determine the location of an RF transmitter within the area 100. Operation of the known transmitter 108 can be in response to local control, for example a person carrying the device through the area can operate it to generate a signal and to associate location information with the signal, periodically as the person walks, drives or otherwise travels to different locations within the area. Alternatively or in addition, the known transmitter 108 can be controlled remotely, for example in response to instructions received from the control system 116. In addition, the known transmitter 108 can operate according to various automated procedures, such as generating a signal that is tagged with location information at predetermined time intervals, or as the known transmitter reaches predetermined locations within the area 100.

Figure 4:
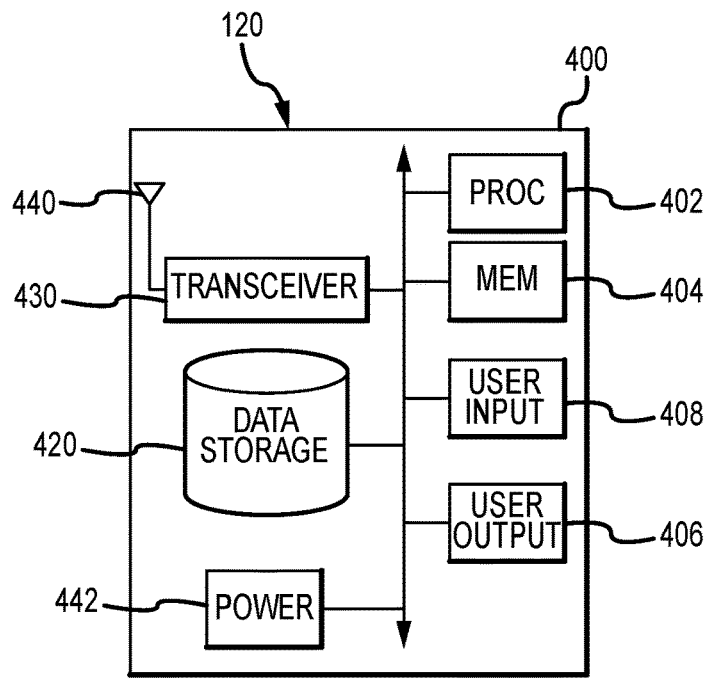
FIG. 4 is a block diagram depicting functional elements of a target transmitter in accordance with embodiments of the present disclosure.

FIG. 4 depicts a target transmitter 120 in accordance with an embodiment of the present invention. In this example, the target transmitter 120 is implemented as a mobile telephone or device 400. However, as can be appreciated by one of skill in the art after consideration of the present disclosure, the target transmitter 120 can be implemented by any other device that operates to transmit RF signals. In addition, the target transmitter 120 is typically, but not necessarily, a mobile device. The mobile device 400 typically includes a processor 402, a memory 404, an RF transceiver 430, an antenna 440, and a power supply 442. In addition, the mobile device can include data storage 420, a microphone, keypad, touch screen or other user input 428, and a speaker, display or other user output 406. As can also be appreciated by one of skill in the art after consideration of the present disclosure, the target transmitter 120 need not be mobile.

As described in greater detail elsewhere herein, the target transmitter 120, configured as a mobile telephone 400 or other device, can be a device that can be identified by its RF transmission, and is typically carried by or with a person, vehicle, article or other item being tracked. Moreover, the content of the RF signals emitted by the target transmitter 120 are not necessarily important, and does not necessarily need to be known in order determine or track the location of the transmitter. In accordance with still other embodiments, a code or identifier, embedded in a signal emitted from the target transmitter 120, a frequency, or some other characteristic is monitored by the receivers 112 and/or the control system 116 to distinguish the target transmitter 120 from other RF transmitters in the area.

Figure 5:
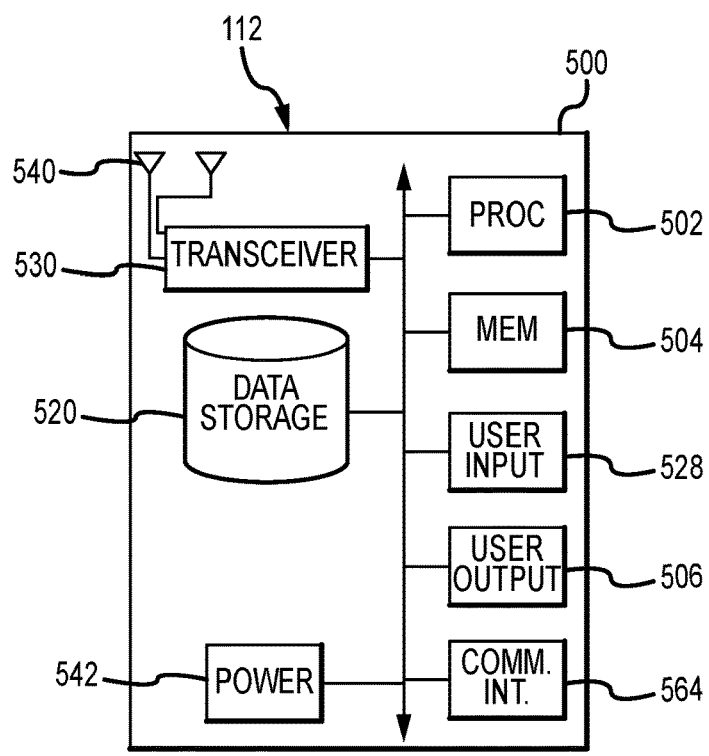
FIG. 5 is a block diagram depicting functional elements of a receiver in accordance with embodiments of the present disclosure.

FIG. 5 illustrates an example of a receiver 112 in accordance with embodiments of the present disclosure. The receiver 112 is generally a device capable of receiving RF signals, and of providing those signals to the system controller 116 for processing. In this example, the receiver 112 is provided by a software defined radio 500. Accordingly, the receiver 112 can include one or more antennas 540, a radio receiver, for instance implemented as a transceiver 530, a processor 502, memory 504, and a network or other communication interface 564. The receiver 112 can also include various user inputs 528 and user outputs 506, data storage 520, and a power supply 542. A communications interface 564, for example a wireline or wireless connection to a local or wide area network, can be included to provide comprising raw or processed signal data and associated information, such as timing information, to the control system 116. If implemented as a wireless interface, the communication interface 564 can include an integral antenna, or can make use of the one or more antennas 540.

The receiver 112 is generally operated from a fixed location. In accordance with other embodiments, the receiver 112 can be operated from different locations, although this typically decreases the accuracy with which the system 104 can determine the location of a target transmitter 120. In accordance with at least some embodiments of the present invention, the receiver 112 includes multiple antennas 540, and can provide a signal received by each antenna 540 in the form of raw or processed signal data to the system controller 116 in connection with signals received from a known transmitter in connection with system calibration, or from a target transmitter 120 in connection with determining the location of the target transmitter 120. The additional signal information obtained through the use of multiple antennas can improve the ability of the system 104 to identify the signatures of RF transmissions from different locations within the area 100.

The number and disposition of the receivers 112 included in the system 104 is selected to provide coverage of the area 100 from multiple angles. In addition, the accuracy of the system 104 in determining the location of a target transmitter 120 generally increases as the number of receivers 112 used during training and target signal acquisition increases. Accordingly, it is usually advantageous to use are relatively large number of receivers 112 positioned at intervals around the area 100 being monitored.

As described in greater detail elsewhere herein, the multiple receivers 112 are deployed about the area 100 so as to provide different angles and/or signal paths between each receiver 112 and the location of an RF signal transmitter 108 or 120. The signals collected by the receivers 112 from a known transmitter 108 provide data that is used to train the neural network of the geolocation module or algorithm 222 executed by the control system 116. After the geolocation algorithm 222, and in particular the deep neural network, has been trained, the signals collected by the receivers 112 from a target transmitter 120 provide data that the deep neural network of the geolocation algorithm 222 uses to determine the location of the target transmitter 120 within the area 100.

The DNN used can be a convolutional neural network (CNN) that uses spectrum data of the RF signals collected by the receivers 112 for training. As an example, each received signal is converted to a power spectral density (PSD) spectrogram via the short time Fourier transform (STFT). Then coupling the PSDs by imposing it into the DNN in an array format (where each antenna signal is a channel in the DNN) allows for joint processing of the RF data. This enables higher-dimensional feature extraction and allows the network to use all the degrees of freedom in the RF data to calculate a correct latitude and longitude. This is novel compared to treating each antenna signal individually, since the optimal solution to the unknown device location entails a joint process of signal multipath over all received signals.

Figure 6:
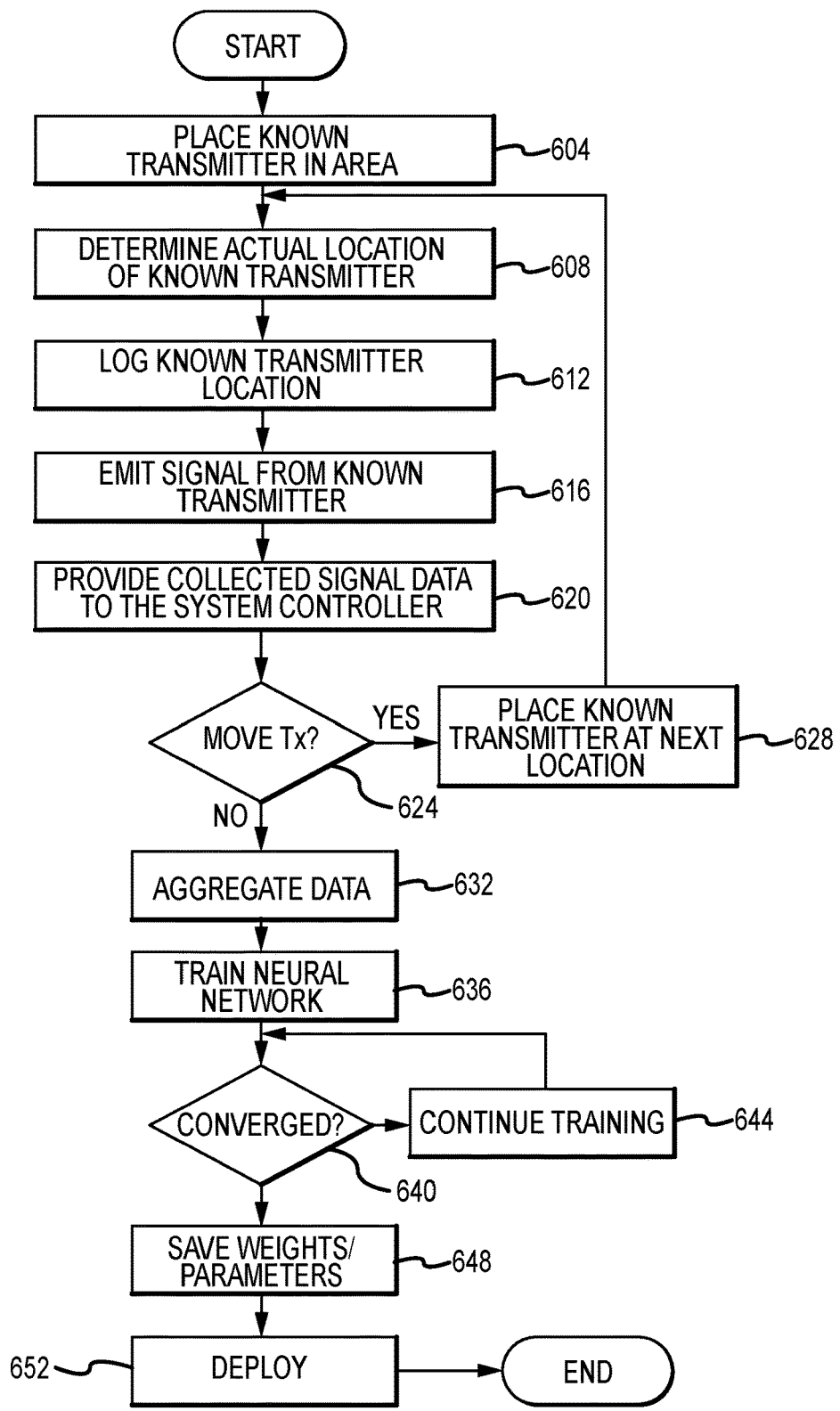
FIG. 6 depicts aspects of a method for training a system to determine a location of a transmitter in accordance with embodiments of the present disclosure.

FIG. 6 illustrates example operations for determining geolocation using deep machine learning. Initially, as part of a data collection or calibration routine for a desired area 100, the known transmitter 108 is placed at a location within the area (step 604). This can include travelling to or near a predetermined grid point or other location. Moreover, the location can be a location where a target transmitter 120 is likely to be located. The actual location of the known transmitter 108 is then determined (step 608). Whether the location is one that is predetermined and specified with a high level or precision, or simply a convenient or generally specified location, the actual location of the known transmitter 108 is determined with high precision. For example, the location can be determined using a GPS or other positioning system receiver 320 included as part of the known transmitter 108. Moreover, the location of the known transmitter 108 can be provided as a latitude and longitude, or other coordinate system. The calibration routine, which may be executed by the system controller 116, receives and logs the true position, for example in latitude and longitude (step 612).

The known transmitter 108 is then operated to emit a signal from the logged location (step 616). In accordance with at least some embodiments of the present disclosure, the signal transmitted by the known transmitter has characteristics that are the same as or are similar to those of the expected target transmitter 120. For example, the known transmitter 108 can use the same frequency, range or frequencies, modulation techniques, signal duration, or other the like as a known or anticipated target transmitter 120. The signal received at the various receivers 112 as a result of the transmission from the known transmitter 108 is collected as raw or processed signal data, and is provided by the receivers 112 to the system controller 116 (step 620). In accordance with embodiments of the present disclosure, each instance of signal data is associated with the location of the known transmitter 108 when the signal was transmitted, and an identification of the receiver 112 that collected the signal data. Additional information can also be captured and stored in association with the records of the signals, such as the precise location of the receiving receiver 112, the time of day, current atmospheric conditions, or any other information that is determined to be relevant to modeling the signatures of signals within the area 100.

At step 624, a determination is made as to whether the known transmitter 108 should be moved and operated to transmit a signal from another location within the area 100. In general, the more locations, and thus the more data points characterizing the signatures of signals transmitted from within the area 100 that can be obtained, the greater the ability of the system 104 to accurately determine the location of a target transmitter 120. As an example, but without limitation, locations can be spaced apart from one another by a selected distance, such as 10 m. However, it is not required that the locations be spaced apart from one another at regular intervals. If it is determined that a transmission should be made from an additional location, the known transmitter 108 can be moved to a next location (step 628). The process can then return to step 608. The steps of the calibration routine can then be repeated until a desired number or density of locations within the area 100 from which signals have been transmitted has been achieved, or until a time allocated or available for such calibration has expired.

After the collection phase, the collected RF signals are aggregated into a joint data manifold (step 632). In particular, the logged true position is associated with each set of collected data, making a training and validation data set. This data set is then fed into the geolocation module 222 executed by, for example, the system controller 116, for supervised training (step 636). During training, the progress of the network is monitored to gauge how well it is learning. If the network diverges or has not converged (step 640), the training is continued (step 644). This can include making changes to various parameters of the neural network. Training continues until a solution is found. When the network converges, then the system 104 stops training and saves off the network weights (step 648). The unsupervised training has now been completed and the network can be operationally deployed (step 652). The task of testing the network using inputs it has not seen previously can also be done at this time. One or more operations of the data collection and calibration process may be implemented using the system controller 116, the known transmitter 108, the receivers 112, and/or other devices.

Figure 7:
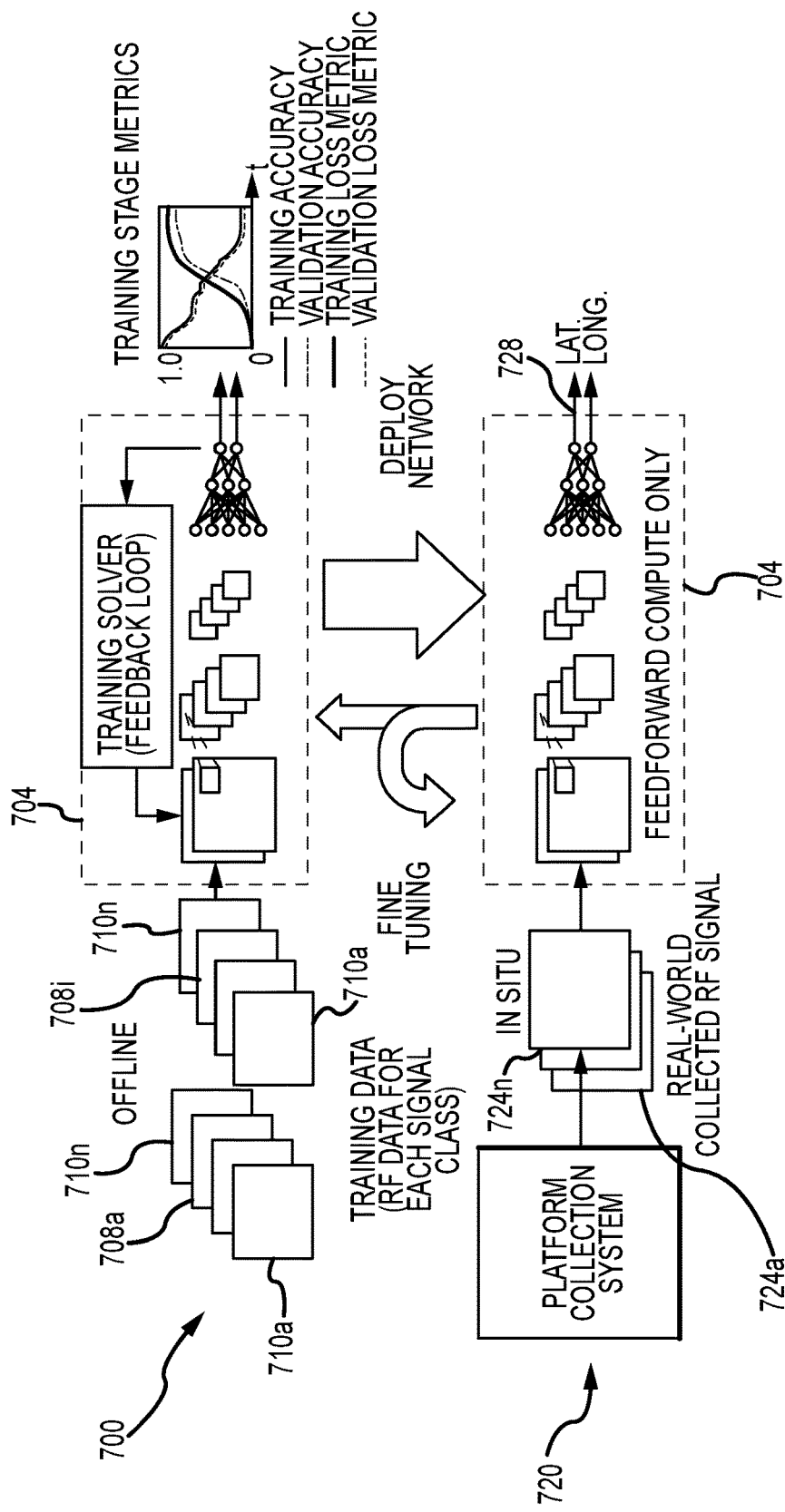
FIG. 7 depicts a process for training a deep neural network and for using a trained deep neural network to provide geolocation information for a transmitting device within an area.

FIG. 7 is a graphical representation of an implementation of a deep neural network (DNN) 704 within a system 104 in accordance with embodiments of the present disclosure. In particular, in flow 700 of FIG. 7, an offline process in accordance with embodiments of the present disclosure for training the DNN 704, such as may be implemented by application programming executed by the control system 116, is depicted. In this process, a plurality of raw data sets 708 containing representations of RF signals 710a-n collected by the plurality of receivers 112a-n at different times (e.g. a first data set 708a t1 collected at time t1 through an ith data set 708i collected at time ti) are input to the DNN 704. That is, each receiver 112 can provide a raw or processed representation of a signal 710 received at a time during which the known transmitter 108 that produced the signal was at a certain location. The data 708 may be a digitized version of the analog signals received by the antennas of the receivers 112. Moreover, the data 710 can be delivered to the control system 116 in raw or processed form. The data 710 may comprise time series plots or time frequency plots of the signals received at the receivers 112. Each of the different times can correspond to different locations of the known transmitter 108 used to transmit the signals. In accordance with embodiments of the present disclosure, the DNN accepts multi-channel spectrograms with one channel for each receiving antenna. The DNN then learns the intricacies of the RF data for the corresponding known transmitter 108 locations. In connection with providing location determination from the RF data, the DNN is trained to output the location coordinates of the known transmitter 108, for example as a latitude and a longitude. In at least some embodiments of the present disclosure, utilizing the outputs of the DNN, the network may also compute other values, such as uncertainty values based on the precision then available from the GPS receiver when the location information was collected, and/or based on the disposition of the receivers 112 relative to the known transmitter 108. Once the DNN has been trained, it is able to determine within some minimum level of accuracy the location of the known transmitter 108 from the patterns or signatures of RF spectrum data received at the receivers 112 when the known transmitter 108 is at that location.

A further implementation can use a DNN adapted to accept raw time-series RF samples from each antenna. With this re-factored architecture, the DNN works on baseband complex-valued data. The layers of the network learn non-linear filter kernels and features from the RF sample data. From this it can directly infer features and salient characteristics from the composite RF signal set that corresponds to a known grid point location. In another implementation, temporal deep networks, such as recurrent neural networks (RNN) can be utilized to examine the RF signals over a time frame to better estimate location.

Figure 8:
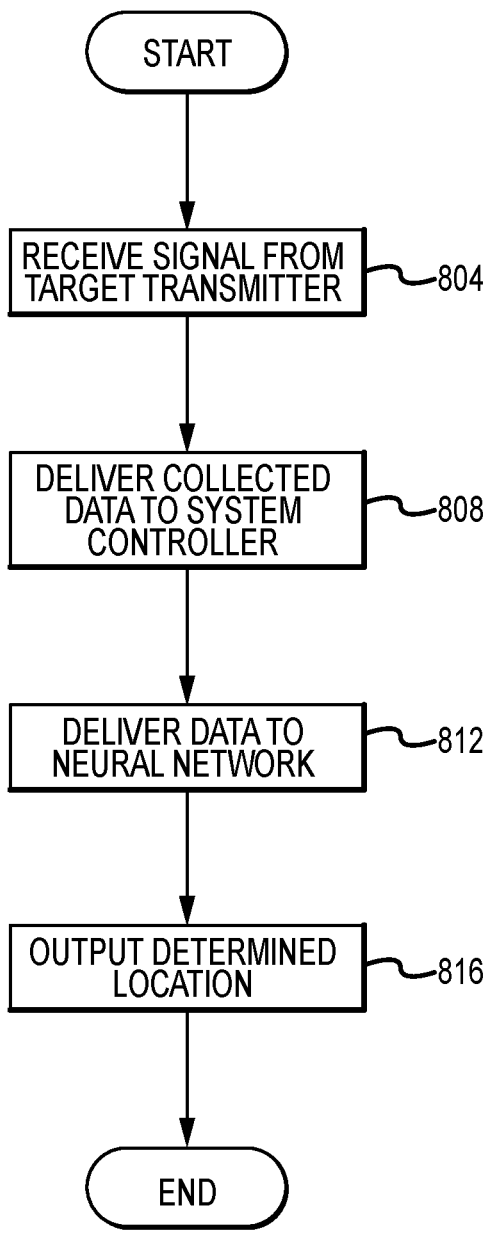
FIG. 8 depicts aspects of a method for operating a system to determine a location of a target transmitter in accordance with embodiments of the present disclosure

FIG. 8 illustrates aspects of a process for using a system 104 to determine the location of a target transmitter 120 within an area 100 with respect to which the system 104 has been trained using calibration and collection steps described herein to associate different transmitter locations with different RF signatures at different receivers 112. As can be appreciated by one of skill in the art after consideration of the present disclosure, because generalization is a feature that is inferred from the training criteria, the network has generalization abilities if it has not overfit the training data. Accordingly, embodiments of the present disclosure allow a location of a target transmitter 120 within an area to be determined, even where the actual location of the target transmitter 120 does not correspond to one of the locations of the known transmitter 108 from which a signal was transmitter during training of the system 104.

Specifically, in operation to determine the location of a target transmitter 120 within an area 100, the receivers 112 receive a signal emitted by the target transmitter 120 (step 804). The data collected by the receivers 112 is delivered to the system controller 116, where it is aggregated (step 808). The aggregated data can also be weakly processed (linearly combined or transformed into a different domain). The processing operations may include transforming the data into the frequency domain (short-time Fourier transform) resulting in jointly processed 2-D spectrograms. The new data may be in the same form that was used in training. At step 812, the new data set is delivered to the geolocation algorithm 222 implementing the DNN, which computes the location of the target transmitter 120 using the deployed model and weights. The determined location can then be output to a user or to another system (step 816). In accordance with at least some embodiments of the present disclosure, the output can be in the form of an estimated latitude and longitude of the target transmitter 120 location. Alternatively or in addition, the estimated location of the target transmitter 120 can be presented on a map displayed by an output device of the control system 116 or an associated device. Other output estimates are also feasible. One or more operations of this process may be implemented using the control system, the receivers 112 and/or other connected devices.

Accordingly, after the DNN has been trained, it can be used to predict the location of a target transmitter 120 from RF spectrum data received at the receivers 112. Moreover, the location of the target transmitter 120 can be predicted even if it is not at a location corresponding to a location from which the known transmitter 108 transmitted a signal for purposes of training the DNN. This process is depicted graphically in flow 720 of FIG. 7. Here, the data from the signals received at each of the receivers 112a-n is provided to the trained DNN 704 as target transmitter data 724a-n, with the signal from each of the receivers 112a-n being fed to a corresponding input of the DNN 704. These inputs are then processed using the trained DNN 704, to obtain an output 728. More particularly, the input information is processed in a feed forward manner through the layers of the DNN, which then produces an output. In accordance with embodiments of the present disclosure, the output includes a location within the area 100. For example, but without limitation, the output may be in the form of a latitude and longitude.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method of determining a location of a transmitter, comprising:
   disposing a plurality of receivers relative to a monitored area;
   placing a known transmitter at different locations within the monitored area;
   for each of the different transmitter locations:
      transmitting a radio frequency (RF) signal from the known transmitter;
      receiving the signal transmitted from the known transmitter at each of the receivers;
      providing a representation of the RF signal transmitted by the known transmitter received at each receiver and an indication of the transmitter location at the time the signal was transmitted to a learning algorithm, wherein the representations of the RF signal include a time series sample of the RF signal received at each receiver, a time frequency sample of the RF signal received at each receiver, or a power spectral density spectrogram of the RF signal received at each receiver;
   training the learning algorithm using the received location and the corresponding representations of the RF signals transmitted by the known transmitter for each of the locations to associate locations within the monitored area with received signal signatures;
   receiving at each of the receivers an RF signal transmitted by a target transmitter;
   providing a representation of the RF signal transmitted by the target transmitter, as received at each receiver at a first time, to the learning algorithm, wherein the representations of the RF signal include a time series sample of the RF signal transmitted by the target transmitter, a time frequency sample of the RF signal transmitted by the target transmitter, or a power spectral density spectrogram of the RF signal transmitted by the target transmitter; and processing the representations of the RF signal transmitted by the target transmitter using the learning algorithm to output a first location of the target transmitter.

2. The method of claim 1, wherein the learning algorithm is a deep neural network.

3. The method of claim 1, wherein the monitored area is a clustered environment.

4. The method of claim 1, wherein the target transmitter is a mobile device.

5. The method of claim 4, wherein the target transmitter is moving through the monitored area.

6. The method of claim 5, further comprising:

providing a representation of the RF signal transmitted by the target transmitter, as received at each receiver at a first time, to the learning algorithm; and processing the representations of the RF signal using the learning algorithm to output a second location of the target transmitter.

7. The method of claim 6, wherein the first location is different than the second location.

8. The method of claim 7, wherein a location of the target transmitter is updated periodically as representations of the RF signal transmitted by the target transmitter as received at each receiver during succeeding time periods are received.

9. The method of claim 7, wherein the known transmitter is a cellular telephone that provides known transmitter location information and time of transmission information to a control system.

10. The method of claim 1, wherein the known transmitter location information and time of transmission information is obtained from a positioning device included in the known transmitter.

11. The method of claim 10, wherein the positioning device is a global positioning system (GPS) receiver.

12. The method of claim 11, wherein the known transmitter is moved between the different locations.

13. The method of claim 12, wherein the different locations correspond to locations along a predicted path of the target device.

14. The method of claim 1, wherein the first location of the target transmitter output by the learning algorithm is not the same as any of the different locations of the known transmitter.

15. The method of claim 1, wherein the RF signal from the target transmitter is a communication signal.

16. The method of claim 1, wherein the monitored area includes a clustered environment.

17. A radio frequency (RF) transmitter locating system, comprising:

a known transmitter, wherein the known transmitter is operable to transmit RF signals from each of a plurality of locations within an area, wherein the transmitted RF signals include a time series signal, a time frequency signal, or a power spectral density spectrogram;

a plurality of receivers, wherein the plurality of receivers are positioned at different locations relative to the area;

a system controller, including:

a communications interface, wherein the system controller receives location information from the known transmitter through the communications interface, and wherein the system controller receives RF signal signature data from the receivers through the communication interface;

memory, the memory including application programming;

a processor, wherein the processor is operable to execute the application programming to record a location of the known transmitter and RF signal signature data received at each of the receivers for each of a plurality of different locations of the known transmitter, and wherein the processor is operable to determine a unique combination of received signals for each of the different locations of the known transmitter, wherein the RF signal signature data received at each of the receivers for each of a plurality of different locations of the known transmitter includes a time series sample, a time frequency sample, or a power spectral density spectrogram;

a target transmitter, wherein the target transmitter is located within the area, wherein the target transmitter is operable to transmit RF signals, wherein the receivers are operable to receive the RF signals transmitted by the target transmitter, wherein the receivers provide the received RF signals transmitted by the target transmitter to the system controller, wherein the application programming determines a location of the target transmitter from the received signals transmitted by the target transmitter, and wherein the system controller outputs a location of the target transmitter.

18. The system of claim 17, wherein at least one of the known transmitter and the target transmitter is a cellular telephone.

19. The system of claim 17, wherein the received RF signals transmitted by the target transmitter are provided to the system controller as a time series sample, a time frequency same, or a power density spectrogram.

20. The system of claim 19, wherein the RF signals transmitted by the target transmitter are communication signals.

* * * * *